United States Patent
Kim (10) Patent No.: US 6,351,492 B1
(45) Date of Patent: Feb. 26, 2002

(54) METHOD AND APPARATUS FOR ENCODING A VIDEO SIGNAL

(75) Inventor: Jin-Hun Kim, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/106,081

(22) Filed: Jun. 29, 1998

(30) Foreign Application Priority Data

Mar. 14, 1998 (KR) ............................................. 98-8638

(51) Int. Cl.[7] ............................................. H04B 14/04
(52) U.S. Cl. ............................. 375/240.08; 375/240.02; 375/240.24
(58) Field of Search ................... 348/405.1; 375/240.02, 375/240.08, 240.24; H04N 7/30

(56) References Cited

U.S. PATENT DOCUMENTS 5,539,466 A * 7/1996 Igarashi et al. ......... 375/240.02
5,777,680 A * 7/1998 Kim ....................... 375/240.04

FOREIGN PATENT DOCUMENTS

EP  0577365  1/1994  .......... H04N/7/133
EP  0751687  1/1997  ............ H04N/7/26

* cited by examiner

Primary Examiner—Howard Britton
(74) Attorney, Agent, or Firm—Pennie & Edmonds LLP (57) ABSTRACT

The encoding type of a target macroblock is determined based on the texture information thereof, and the shape information and the texture information on the target macroblock are re-formed in response to the encoding type. After the CBPY bit number of the target macroblock is determined based on the re-formed shape information, the CBPY bit number being the number of non-transparent subblock's, the re-formed texture information of the target macroblock transformed and quantized into a set of quantized transformation coefficients for each non-transparent subblock based on the CBPY bit number. The CBPY information for the target macroblock is generated, wherein the CBPY information represents whether or not the set of quantized transformation coefficients for said each non-transparent subblock contains at least one non-zero component therein, and the encoding_type and the CBPY information for the target macroblock are multiplexed into a bit stream.

14 Claims, 6 Drawing Sheets

| ENCODED SHAPE INFORMATION | ... | DCT_TYPE INFORMATION | ... | ENCODED CBPY INFORMATION | ... | ENCODED TEXTURE INFORMATION |

METHOD AND APPARATUS FOR ENCODING A VIDEO SIGNAL

FIELD OF THE INVENTION

The present invention relates to a method and an apparatus for encoding a video signal; and, more particularly, to a method and an apparatus for effectively encoding texture information of the video signal based on the re-formed shape information according to the encoding type selected to encode the texture information.

DESCRIPTION OF THE PRIOR ART

In digital video systems such as video-telephone and teleconference systems, a large amount of digital data is needed to define each video signal since the video signal comprises a sequence of digital data referred to as pixel values. Since, however, the available frequency bandwidth of a conventional transmission channel is limited, in order to transmit the substantial amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique wherein an input video image is divided into objects and three sets of parameters for defining the motion, contour and pixel data of each object are processed through different encoding channels.

One example of such object-oriented coding schemes is the so-called MPEG (Moving Picture Experts Group) phase 4 (MPEG-4), which is designed to provide an audio-visual coding standard for allowing a content-based interactivity, improved coding efficiency and/or universal accessibility in such applications as low bit-rate communication, interactive multimedia (e.g., games, interactive TV, etc.) and area surveillance (see, for instance, *MPEG-4 Video Verification Model Version* 7.0, International Organization for Standardization, Coding of Moving Pictures and Associated Audio Information, ISO/IEC JTC1/SC29/WG11 MPEG97/N1642, Bristol, April 1997).

According to MPEG-4, an input video image is divided into a plurality of video object planes (VOP's), which correspond to entities in a bitstream that a user can access and manipulate. A VOP can be represented by a bounding rectangle whose width and height may be the smallest multiples of 16 pixels (a macroblock size) surrounding each object so that the encoder processes the input video image on a VOP-by-VOP basis.

A VOP disclosed in MPEG-4 includes shape information and texture information for an object therein which are represented by a plurality of macroblocks on the VOP, each of the macroblocks having, e.g., 16×16 pixels. Each of the macroblocks on the VOP can be classified into one of a background, a boundary and an object macroblocks. The background macroblock contains only background pixels located outside an object in the VOP; the boundary macroblock includes at least one background pixel and at least one object pixel located inside the object; and the object macroblock has only object pixels. The shape information is encoded by using, e.g., a context-based arithmetic encoding (CAE) technique on a macroblock basis, while the texture information is encoded through the use of conventional encoding techniques such as DCT (discrete cosine transform), quantization and statistical coding processes on the macroblock basis. Specifically, the DCT process for transforming the texture information is performed on a DCT-block basis, wherein a macroblock is divided into 4 DCT-blocks of 8×8 pixels.

Through the DCT and the quantization processes, one DC component and a multiplicity of AC components are produced for each DCT-block, wherein each AC component has much more information than the DC component so that it requires many bits to represent itself. However, if the texture information for a DCT-block can be represented as constant, there will be no corresponding non-zero AC component for the DCT-block. Therefore, CBPY (coded block pattern type) information has been proposed to represent whether a DCT-block has at least one corresponding non-zero AC component. To be more specific, if there exists at least one non-zero AC component corresponding to a DCT-block, the CBPY information obtains a bit of, e.g., "1", and, if otherwise, a bit of, e.g., "0". Accordingly, a decoding part can tell the existence of any non-zero AC component for a corresponding DCT-block by simply detecting the CBPY information transmitted thereto through a transmission channel without any further information for the corresponding DCT-block and before encoded texture information for the corresponding DCT-block is transmitted thereto.

Conventionally, the CBPY information is determined based on only the shape information of each macroblock. For instance, a background macroblock has no object pixel so that no CBPY information is generated. Also, the CBPY information of an object macroblock will have 4-bit data, each bit corresponding to one of the 4 DCT-blocks within the macroblock, since the object macroblock has 4 non-transparent DCT-blocks, wherein a non-transparent DCT-block has a DCT-block size and contains at least one object pixel to be encoded.

Figure 3A:
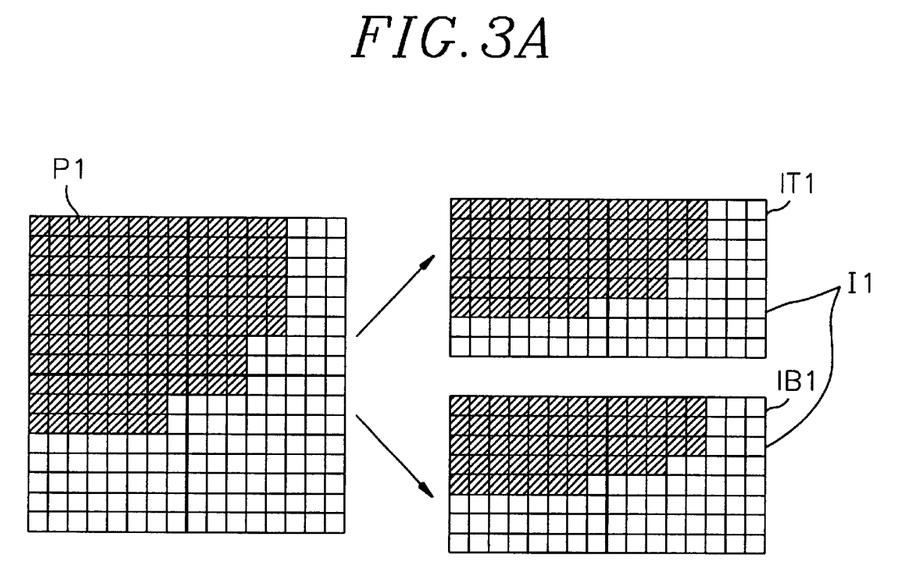
FIGS. 3A and 3C describe examples of boundary macroblocks which are classified into two different types.

In addition, a boundary macroblock can include both a transparent DCT-block and a non-transparent DCT-block together, wherein the transparent DCT-block has only background pixels therein and need not be encoded so that the CBPY information corresponding to the boundary macroblock may have i-bit data, i being a positive integer ranging from 1 to 4, and the respective bits corresponding to the respective non-transparent DCT-blocks in the macroblock. Referring to FIG. 3A, each of the 4 DCT-blocks of the boundary macroblock P1 has at least one object pixel so that 4-bit CBPY information is generated, wherein each of the squares represents a pixel, each shaded square being an object pixel and each white one being a background pixel. Similarly, in FIGS. 3B , 3B and 3C only 2 DCT-blocks of the boundary macroblock P2 and P3 have at least one object pixel, respectively, so that only 2-bit CBPY is generated.

In the meantime, in order to encode the texture information for the VOP, the texture information on each of the macroblocks has been processed by adaptively using a progressive and an interlaced coding techniques to thereby enhance the coding efficiency. Therefore, DCT_type information representing a coding condition, i.e., a DCT_type, of the texture information has been employed, wherein the DCT_type has been determined on the macroblock basis using the texture information. For example, a frame and a field correlation coefficients are calculated, wherein the frame correlation coefficient is a sum of absolute first differences, each first differences being an error between a line pair including an even line and an adjacent odd line of the macroblock and the field correlation coefficient is a sum of absolute second differences and absolute third differences, each second difference and each third difference being errors between a consecutive even-line pair and between a consecutive odd-line pair, respectively, of the macroblock; and, then, the DCT-type is determined by comparing the frame correlation coefficient with the field correlation coefficient. In another preferred embodiment, each absolute difference can be replaced with a square error(see, *MPEG-4 Video Verification Model Version* 7.0, supra, p 54). The smaller the correlation coefficient is, the higher the degree of the correlation is. If the frame correlation is equal to or higher than the field correlation so that the progressive coding technique is determined to be more effective, the DCT_type information on the macroblock will have a bit of, e.g., "0", and, if otherwise, a bit of, e.g., "1".

Figure 3B:
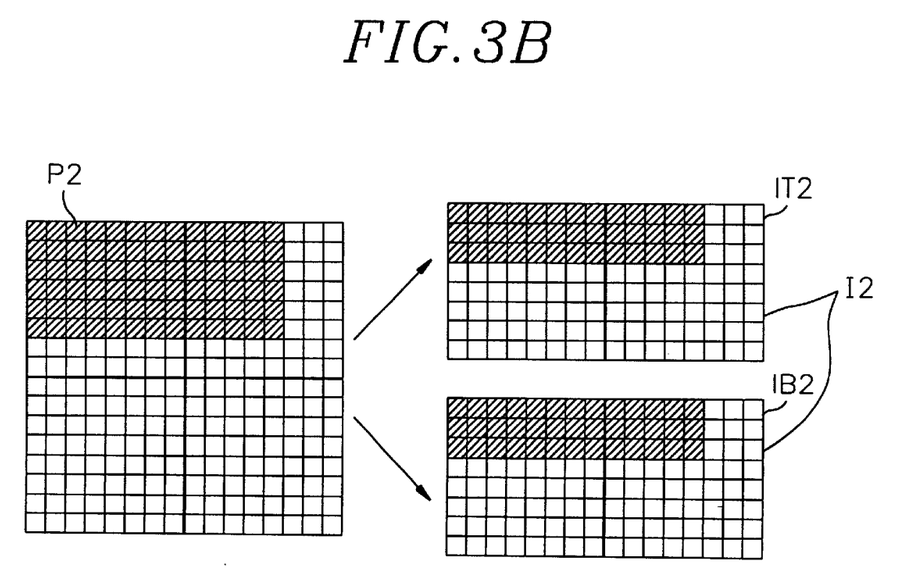
Figure 3C:
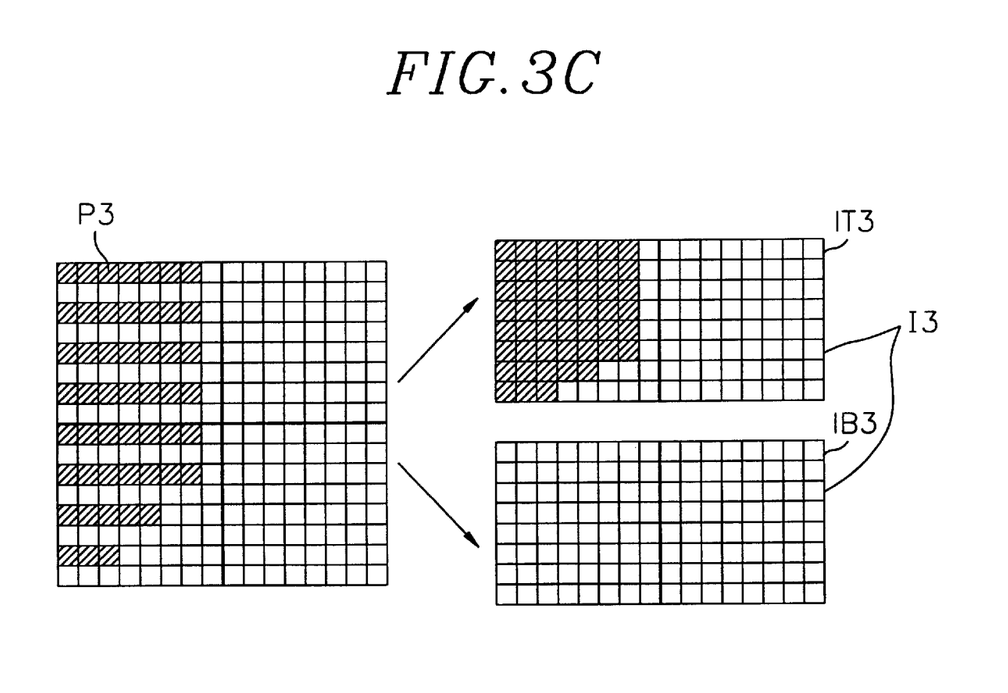

However, the bit-number of the CBPY information in the boundary macroblock depends on the DCT_type thereof. In FIGS. 3B and 3C, the numbers of non-transparent DCT-blocks within a progressive and an interlaced type macroblocks are different from each other depending on their DCT_types. Consequently, the bit-number of the CBPY information is also changed according to the DCT_type. To be more specific, when the macroblock P2 is encoded through the progressive coding technique, 2-bit CBPY information is generated and, if otherwise, 4-bit CBPY information is produced. Meanwhile, when the macroblock P3 is encoded through the progressive coding technique, 2-bit CBPY information is generated and, if otherwise, 1-bit CBPY information is produced.

As can be noted above, if a macroblock to be processed is a boundary macroblock, the bit-number of the CBPY information, i.e., the number of non-transparent DCT-blocks therein, should be determined depending on its DCT_type.

Since, furthermore, a data stream to be transmitted to the decoding part has a sequence of CBPY information and DCT_type information, the decoding part may not correctly predict the bit-number of the CBPY information, i.e., the number of non-transparent DCT-blocks within the processed macroblock and, consequently, may not accurately reconstruct the CBPY information.

SUMMARY OF THE INVENTION

It is, therefore, a primary object of the invention to provide a method and an apparatus, for use in a video signal encoder, for effectively encoding texture information of a video signal by generating CBPY information based on a encoding type determined by the texture information.

In accordance with the present invention, there is provided a method, for use in a video signal encoder, for coding texture information of a video signal which includes the texture information and shape information on each of macroblocks, each macroblock having M×M pixels and being dividable into P number of equal-sized subblocks, M and P being positive integers, respectively, comprising the steps of:

(a) determining an encoding_type of a target macroblock based on the texture information thereof, wherein the encoding_type represents the more effective coding technique between a progressive and an interlaced coding techniques for encoding the texture information thereof;

(b) re-forming the shape information and the texture information on the target macroblock in response to the encoding_type to generate re-formed shape information and re-formed texture information thereof, respectively;

(c) detecting the re-formed shape information on a DCT-block basis to find a CBPY bit number of the target macroblock, wherein the CBPY bit number is the number of bits for non-transparent subblocks, each non-transparent subblock having a subblock size and containing at least one object pixel;

(d) if the CBPY bit number is not zero, transforming the re-formed texture information of the target macroblock into a set of transformation coefficients for each non-transparent subblock based on the CBPY bit number and quantizing the set of transformation coefficients to thereby produce a set of quantized transformation coefficients;

(e) detecting the set of quantized transformation coefficients for said each non-transparent subblock to generate CBPY information for the target macroblock, wherein the CBPY information represents whether or not the set of quantized transformation coefficients for said each non-transparent subblock contains at least one non-zero component therein; and (f) multiplexing the encoding_type and the CBPY information for the target macroblock to generate a bit stream.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A video signal includes shape information and texture information on a plurality of macroblocks therein and, in accordance with embodiments of the present invention, the texture information is adaptively encoded on a macroblock basis through the use of either a progressive or an interlaced coding technique. Each of the macroblocks has M×M, e.g., 16×16, pixels and can be divided into 4 DCT-blocks having a same number of pixels, e.g., 8×8 pixels, M being a positive integer.

Figure 1:
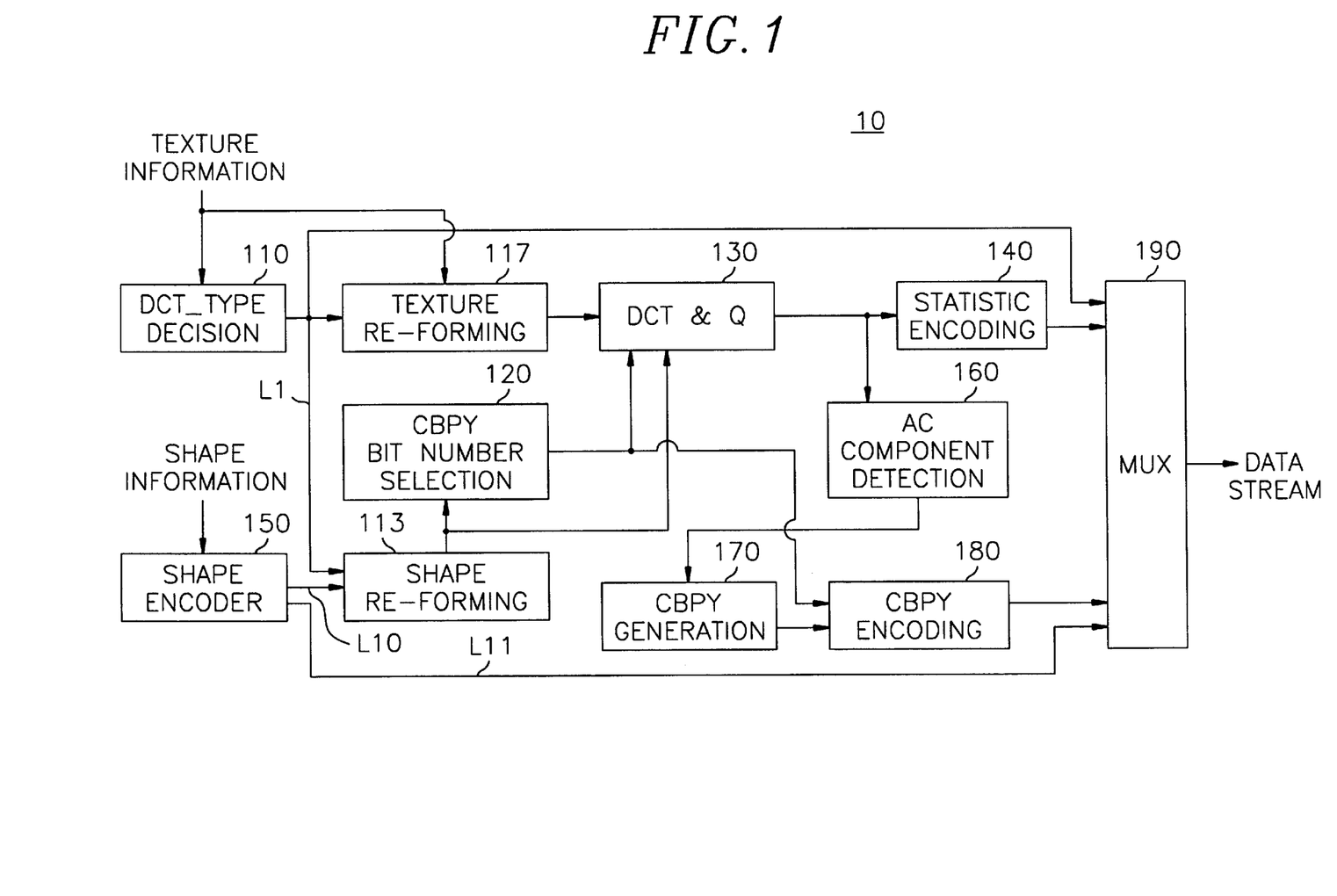
FIG. 1 represents a block diagram of a video signal encoder in accordance with the present invention.

Referring to FIG. 1, there is provided a block diagram of a video signal encoder 10 in accordance with the present invention.

Texture information on a processing macroblock is inputted to a DCT_type decision unit 110 and a texture re-forming unit 117 in parallel and its corresponding shape information is coupled to a shape encoder 150.

The shape encoder 150 encodes the shape information by using a known shape coding method, e.g., the CAE technique disclosed in MPEG-4, supra, to thereby generate encoded shape information and provide the encoded shape information to a multiplexor (MUX) 190 via a line L1. The shape encoder 150 also provides reconstructed shape information on the processing macroblock, which is generated by decoding the encoded shape information, to a shape reforming unit 113 via a line L10.

In the meantime, the DCT_type decision unit 110 decides a DCT_type of the processing macroblock by using a known DCT_type determination method based on the texture information and, then, supplies DCT_type information to the MUX 190, the texture re-forming unit 117 and the shape re-forming unit 113 via a line L1, wherein the DCT_type information represents whether or not the progressive coding technique on the processing macroblock is determined to be more effective than the interlaced coding technique.

First of all, if the DCT_type information representing the progressive coding type is coupled to the shape re-forming unit 113 via the line L1, the shape re-forming unit 113 directly transfers the reconstructed shape information provided from the shape encoder 150 as the progressive shape information to a coded block pattern type (CBPY) bit number selection unit 120 and a DCT and Q unit 130. On the other hand, the shape re-forming unit 113 provides re-formed shape information, i.e., interlaced shape information, generated by shuffling the reconstructed shape information according to the interlaced coding technique, to the CBPY bit number selection unit 120 and the DCT and Q unit 130 if the DCT_type information representing the interlaced coding type is inputted thereto.

Similarly, if the DCT_type information representing the progressive coding type is coupled to the texture re-forming unit 117 via the line L1, the texture re-forming unit 117 directly delivers the texture information coupled thereto as the progressive texture information to the DCT and Q unit 130. On the other hand, the texture re-forming unit 117 provides re-formed texture information, i.e., interlaced texture information, produced by shuffling the texture information according to the interlaced coding technique, to the DCT and Q unit 130 if the DCT_type information representing the interlaced coding type is inputted thereto.

In the meantime, the CBPY bit number selection unit 120 detects the re-formed shape information, i.e., the progressive shape information or the interlaced shape information fed from the shape re-forming unit 113 so as to find non-transparent DCT-blocks, if any, among DCT-blocks in the re-formed shape information, wherein each non-transparent DCT-blocks has a DCT-block size and contains at least one object pixel; and determining the number of non-transparent DCT-blocks for the processing macroblock as a CBPY bit number. Specifically, a non-transparent DCT-block requires one bit CBPY. The CBPY bit number is coupled to the DCT and Q unit 130 and a CBPY encoding unit 180. If the CBPY bit number is zero, i.e., the processing macroblock is a background macroblock, its texture information is not encoded in the DCT and Q unit 130 and the CBPY encoding unit 180 and, therefore, its CBPY information and encoded texture information described below are not generated.

Referring to FIGS. 3A to 3C, there are provided various examples of boundary macroblocks which are classified into two different types, i.e., a progressive and an interlaced type macroblocks. The macroblocks P1 to P3, which represent progressive type macroblocks, respectively, are re-formed to interlaced type macroblocks I1 to I3 including top- and bottom-field DCT-blocks IT1 and IB1 to IT3 and IB3, respectively. For example, in FIG. 3A, the numbers of non-transparent DCT-blocks in the progressive and the interlaced type macroblocks P1 and I1 are identical to each other, e.g., 4. In FIG. 3B, the number of non-transparent DCT-blocks in the progressive type macroblock P2 is 2 while that in the interlaced type macroblock I2 is 4. In FIG. 3C, the number of non-transparent DCT-blocks in the progressive type macroblock P3 is 2 while that in the interlaced type macroblock I3 is 1.

If the CBPY bit number is not zero so that the processing macroblock is classified as a boundary macroblock, having at least one object pixel, or an object macroblock, having only object pixels, the DCT and Q unit 130 converts the re-formed texture information corresponding to each of the non-transparent DCT-blocks into a set of DCT coefficients; and quantizes the set of DCT coefficients to provide a set of quantized DCT coefficients to a statistic encoding unit 140 and an AC component detection unit 160. Specifically, if the CBPY bit number is not zero and the progressive coding technique is selected for encoding the processing block, the progressive texture information on at least one non-transparent DCT-block, which is determined based on the progressive shape information, is transformed into DCT coefficients on the DCT-block basis. On the other hand, if the CBPY bit number is not zero while the interlaced coding technique is chosen, the interlaced texture information on at least one non-transparent DCT-block, which is determined based on the interlaced shape information, is converted into DCT coefficients on the DCT-block basis.

In FIG. 3A, since the progressive and the interlaced type macroblocks P1 and I1 have only non-transparent DCT-blocks, respectively, the texture information on the processing macroblock is converted to 4 sets of quantized DCT coefficients at the DCT and Q unit 130. On the other hand, since the P2 and P3 have two non-transparent DCT-blocks, the texture information corresponding to each of the two non-transparent DCT-blocks is converted to a set of quantized DCT coefficients, while since the interlaced type macroblocks I2 and I3 have 4 and 1 non-transparent DCT-blocks, respectively, the texture information on the interlaced type macroblock I2 and that on I3 are converted to 4 and 1 set of quantized DCT coefficients, respectively.

The statistic encoding unit 140 produces encoded texture information by compressing the set of quantized DCT coefficients derived from the DCT and Q unit 130 through the use of, e.g., a variable length coding technique, and provides the encoded texture information to the MUX 190.

The AC component detection unit 160 checks whether there exists at least one non-zero AC component in the set of quantized DCT coefficients and provides the check result to a CBPY generation unit 170.

If the check result represents that the set of quantized DCT coefficients contains at least one non-zero AC component therein, the CBPY generation unit 170 generates a CBPY bit, e.g., "1", for the set and, if otherwise, a CBPY bit, e.g., "0". If CBPY bits for all sets of DCT coefficients, i.e., all the non-transparent DCT-blocks, corresponding to the processing macroblock are decided through the above processes, the CBPY generation unit 170 provides the CBPY bits as CBPY information to a CBPY encoding unit 180.

The CBPY encoding unit 180 takes a VLC table based on the CBPY bit number fed from the CBPY bit number selection unit 120; detects a variable length code (VLC) for the CBPY information in the VLC table; and provides the detected VLC to the MUX 190 as encoded CBPY information.

Figure 4:
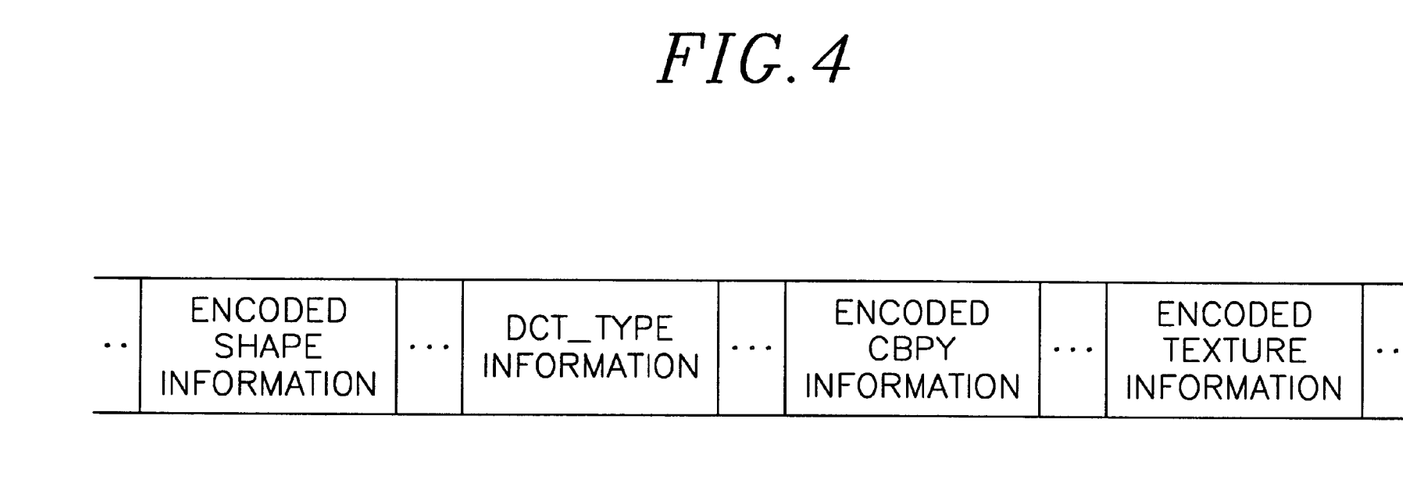
FIG. 4 shows a sequence of a data stream to be transmitted to a decoding part.

The MUX 190 multiplexes the DCT_type information, the encoded texture information, the encoded CBPY information and the encoded shape information fed thereto; and provides a data stream for the processing macroblock in a sequence of the encoded shape information, the DCT_type information, the encoded CBPY information and the encoded texture information, as described in FIG. 4, to a transmitter (not shown) for the transmission thereof.

Figure 2A:
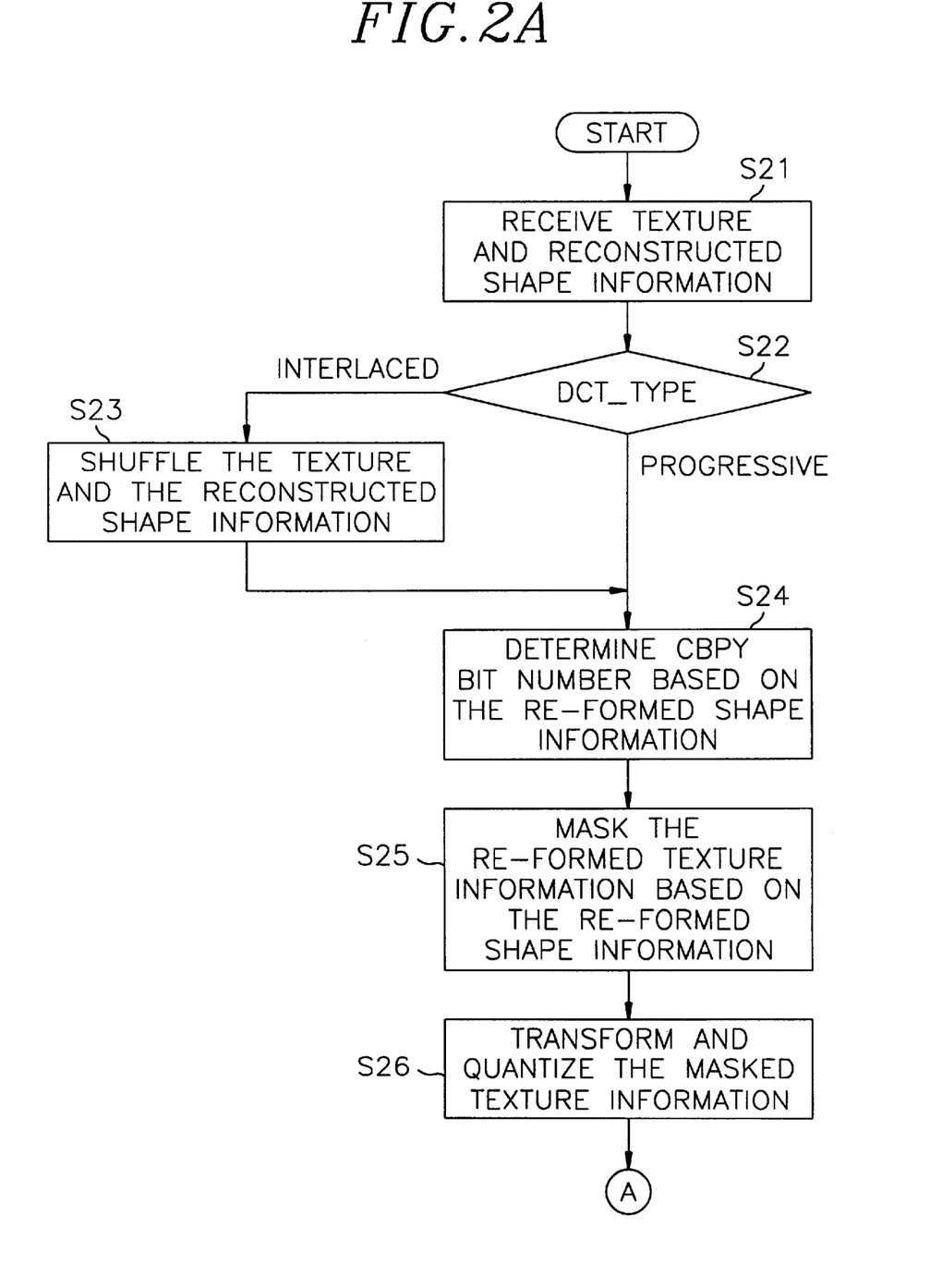
FIGS. 2A and 2B provide a flow chart regarding the encoding algorithm of a video signal in accordance with the present invention.
Figure 2B:
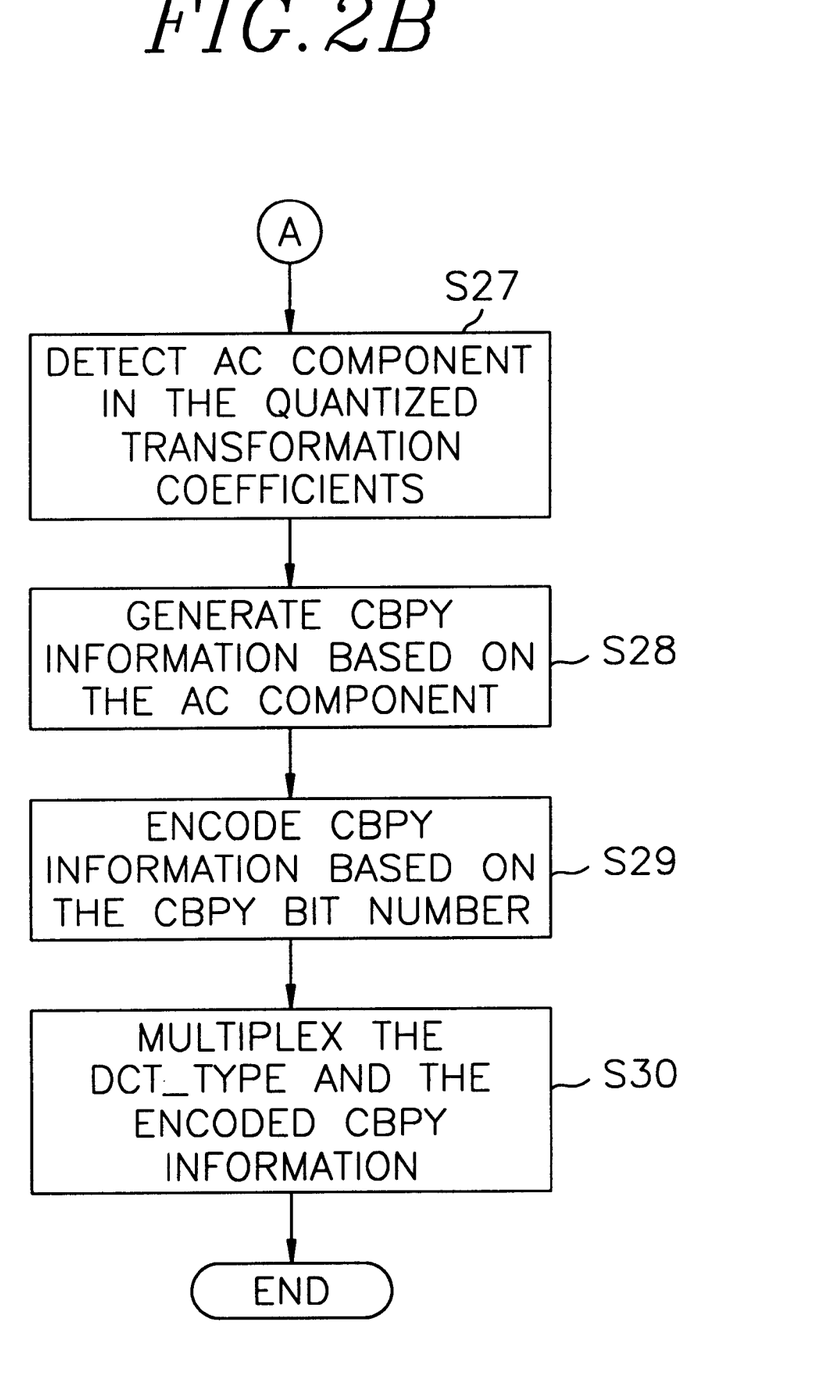

Referring to FIGS. 2A and 2B, there is provide a flow chart regarding the encoding algorithm of a video signal in accordance with the present invention.

At step S21, the texture information and its corresponding reconstructed shape information for a processing macroblock are received and, at step S22, an encoding_type, i.e., a DCT_type, of the processing macroblock is determined based on the texture information thereof, wherein the encoding_type represents whether or not the progressive coding technique is preferable to the interlaced coding technique.

If the progressive technique is preferable, the texture and its reconstructed shape information are preserved as the re-formed texture and shape information, respectively, and goes to step S24; and, if otherwise, at step S23, the texture and its reconstructed shape information are shuffled separately so that the shuffled texture and reconstructed shape information, i.e., the interlaced texture and shape information, take the place of the re-formed texture and shape information and goes to step S24.

At step S24, the re-formed shape information of the processing macroblock is detected on a DCT-block basis; it is determined whether each DCT-block corresponds to non-transparent DCT-block, wherein the non-transparent DCT-block contains at least one object pixel; and the CBPY bit number, the number of non-transparent DCT-blocks in the processing macroblock, is calculated. That is, the CBPY bit number is determined based on the re-formed shape information generated according to the DCT_type.

If the CBPY bit number is not zero, i.e., the processing macroblock does not correspond to a background macroblock, at step S25, the re-formed texture information is masked out by the re-formed shape information so that the re-formed texture information only on the non-transparent DCT-blocks are selected; the non-transparent DCT blocks are transformed on a DCT-block basis into a set of DCT coefficients; and the set of DCT coefficients is quantized into a set of quantized DCT coefficients.

At step S27, it is detected whether or not the set of quantized DCT coefficients contains at least one non-zero AC component, wherein the set of quantized DCT coefficients has a DC component and a plurality of AC coefficients.

At step S28, if the set of quantized DCT coefficients for a non-transparent DCT-block contains at least one non-zero AC component therein, a CBPY bit number, e.g., "1" is assigned thereto and, if otherwise, a CBPY bit, e.g., "0" is assigned. So all CBPY's of the processing macroblock correspond to the CBPY information and, at step S29, the CBPY information is encoded based on the CBPY bit number to generate encoded CBPY information of the processing macroblock.

The DCT_type information and the encoded CBPY information are multiplexed in this order at step S30.

Since, as a result, the DCT_type of the texture information can tell not only the coding condition thereof but also a shuffling state of the shape information, the CBPY bit number at the decoding part is easily estimated based on the shuffled shape information and, therefore, the existence of non-zero AC components for each DCT-block is simply determined by detecting only the CBPY information before receiving the encoded texture information for the DCT-block.

While the present invention has been described with respect to certain preferred embodiments only, other modifications and variations may be made without departing from the spirit and scope of the present invention as set forth in the following claims.

What is claimed is:

1. A method, for use in a video signal encoder, for coding texture information of a video signal which includes the texture information and shape information on each of macroblocks, each macroblock having M×M pixels and being dividable into P number of equal-sized subblocks, M and P being positive integers, respectively, comprising the steps of:

(a) determining an encoding_type of a target macroblock based on the texture information thereof, wherein the encoding_type represents a more effective coding technique between a progressive and an interlaced coding techniques for encoding the texture information thereof;

(b) re-forming the shape information and the texture information on the target macroblock in response to the encoding_type to generate re-formed shape information and re-formed texture information thereof, respectively;

(c) detecting the re-formed shape information on a DCT-block basis to find a CBPY (coded block pattern type) bit number of the target macroblock, wherein the CBPY bit number is the number of bits for non-transparent subblocks, each non-transparent subblock having a subblock size and containing at least one object pixel;

(d) if the CBPY bit number is not zero, transforming the re-formed texture information of the target macroblock into a set of transformation coefficients for each non-transparent subblock based on the CBPY bit number and quantizing the set of transformation coefficients to thereby produce a set of quantized transformation coefficients;

(e) detecting the set of quantized transformation coefficients for said each non-transparent subblock to generate CBPY information for the target macroblock, wherein the CBPY information represents whether or not the set of quantized transformation coefficients for said each non-transparent subblock contains at least one non-zero component therein; and (f) multiplexing the encoding_type and the CBPY information for the target macroblock to generate a bit stream.

2. The method of claim 1, wherein said bit stream is in sequence of the encoding_type and the CBPY information.

3. The method of claim 2, wherein the set of quantized transformation coefficients contains a DC component and a plurality of AC components and said CBPY information represents whether or not the set of quantized transformation coefficients for said each non-transparent subblock contains at least one non-zero AC component therein.

4. The method of claim 3, wherein the step (e) includes the steps of:

(e1) determining whether or not the set of quantized transformation coefficients for said each non-transparent subblock contains at least one non-zero AC component therein to thereby generate one bit CBPY for said each non-transparent subblock;

(e2) preparing a statistical coding table for the target macroblock corresponding to the CBPY bit number; and (e3) encoding all CBPY's for the target macroblock based on the statistical coding table to generate the CBPY information.

5. The method of claim 4, wherein the step (b) includes the steps of:

(b1) if the encoding_type of the target macroblock is determined as the progressive coding technique, preserving the shape information and the texture information; and (b2) if the encoding_type of the target macroblock is determined as the interlaced coding technique, shuffling the shape information and the texture information to generate the interlaced shape information and the interlaced texture information, respectively.

6. The method of claim 5, wherein the step (a) includes the steps of:

(a1) calculating a frame and a field correlation coefficients, wherein the frame correlation coefficient is a sum of absolute first differences, each first differences being an error between a line pair including an even line and an adjacent odd line of the macroblock and the field correlation coefficient is a sum of absolute second differences and absolute third differences, each second difference and each third difference being errors between a consecutive even-line pair and between a consecutive odd-line pair, respectively, of the macroblock; and (a2) deciding the encoding_type based on the frame and the field correlation coefficients.

7. The method of claim 6 further comprising, prior to the step (a), the steps of:

(x) producing encoded shape information by encoding the shape information on the target macroblock; and (y) reconstructing the shape information on the target macroblock by decoding the encoded shape information.

8. An apparatus, for use in a video signal encoder, for coding texture information of a video signal which includes the texture information and shape information on each of macroblocks, each macroblock having M×M pixels and being dividable into P number of equal-sized subblocks, M and P being positive integers, respectively, the apparatus comprising:

means for determining an encoding_type of a target macroblock based on the texture information thereof, wherein the encoding_type represents a more effective coding technique between a progressive and an interlaced coding techniques for encoding the texture information thereof;

means for re-forming the shape information and the texture information on the target macroblock in response to the encoding_type to generate re-formed shape information and re-formed texture information thereof, respectively;

means for detecting the re-formed shape information on a DCT-block basis to find a CBPY (coded block pattern type) bit number of the target macroblock, wherein the CBPY bit number is the number of bits for non-transparent subblocks, each non-transparent subblock having a subblock size and containing at least one object pixel;

means for transforming the re-formed texture information of the target macroblock into a set of transformation coefficients for each non-transparent subblock based on the CBPY bit number and quantizing the set of transformation coefficients to thereby produce a set of quantized transformation coefficients;

CBPY information generating means for detecting the set of quantized transformation coefficients for said each non-transparent subblock to generate CBPY information for the target macroblock, wherein the CBPY information represents whether or not the set of quantized transformation coefficients for said each non-transparent subblock contains at least one non-zero component therein; and means for multiplexing the encoding_type and the CBPY information for the target macroblock to generate a bit stream.

9. The apparatus of claim 8, wherein said bit stream is in sequence of the encoding_type and the CBPY information.

10. The apparatus of claim 9, wherein the set of quantized transformation coefficients contains a DC component and a plurality of AC components and said CBPY information represents whether or not the set of quantized transformation coefficients for said each non-transparent subblock contains at least one non-zero AC component therein.

11. The apparatus of claim 10, wherein said CBPY information generating means includes:

means for determining whether or not the set of quantized transformation coefficients for said each non-transparent subblock contains at least one non-zero AC component therein to thereby generate one bit CBPY for said each non-transparent subblock;

means for preparing a statistical coding table for the target macroblock corresponding to the CBPY bit number; and means for encoding all CBPY's for the target macroblock based on the statistical coding table to generate the CBPY information.

12. The apparatus of claim 11, wherein said shape information re-forming means includes means for shuffling the shape information and the texture information to generate the interlaced shape information and the interlaced texture information, respectively.

13. The apparatus of claim 12, wherein said encoding_type determining means includes:

means for calculating a frame and a field correlation coefficients, wherein the frame correlation coefficient is a sum of absolute first differences, each first differences being an error between a line pair including an even line and an adjacent odd line of the macroblock and the field correlation coefficient is a sum of absolute second differences and absolute third differences, each second difference and each third difference being errors between a consecutive even-line pair and between a consecutive odd-line pair, respectively, of the macroblock; and means for comparing the frame correlation coefficient with the field correlation coefficient to decide the encoding_type of the macroblock.

14. The apparatus of claim 13 further comprising:

means for producing encoded shape information by encoding the shape information on the target macroblock; and means for reconstructing the shape information on the target macroblock by decoding the encoded shape information.

* * * * *